Nov. 10, 1942.        D. W. BUSHNELL              2,301,365
                    PRESSURE RELIEF VENT
                    Filed March 6, 1940
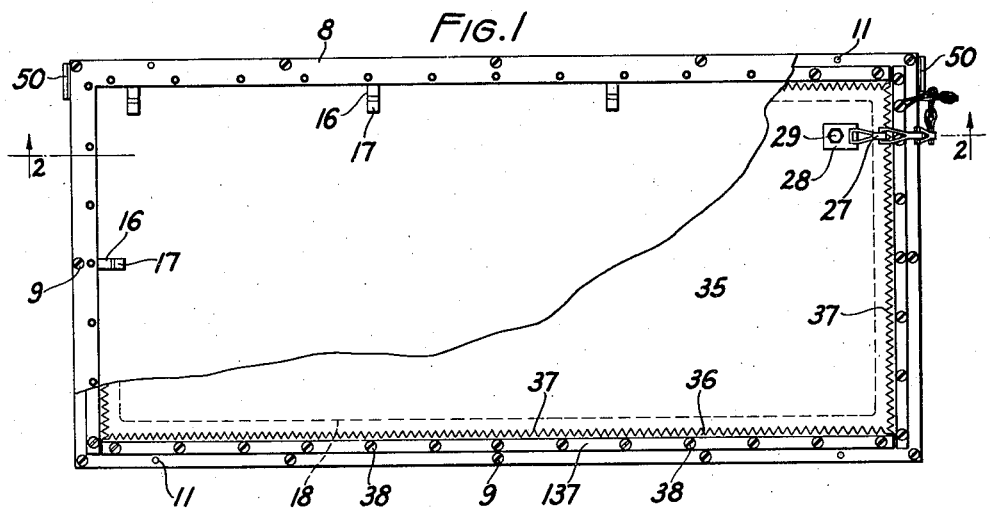
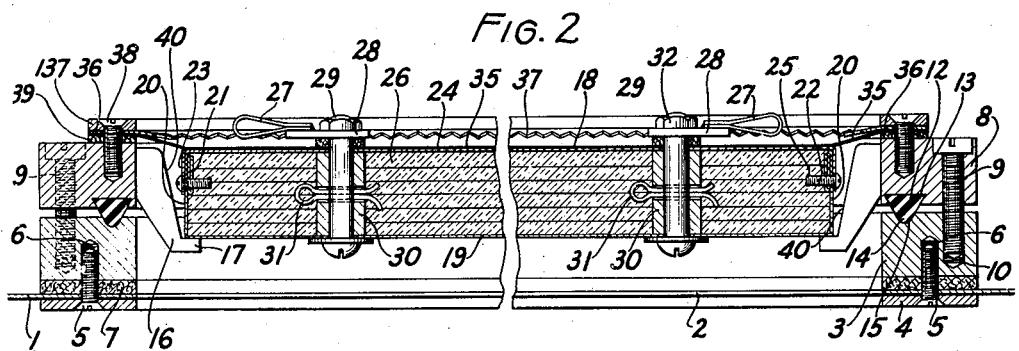
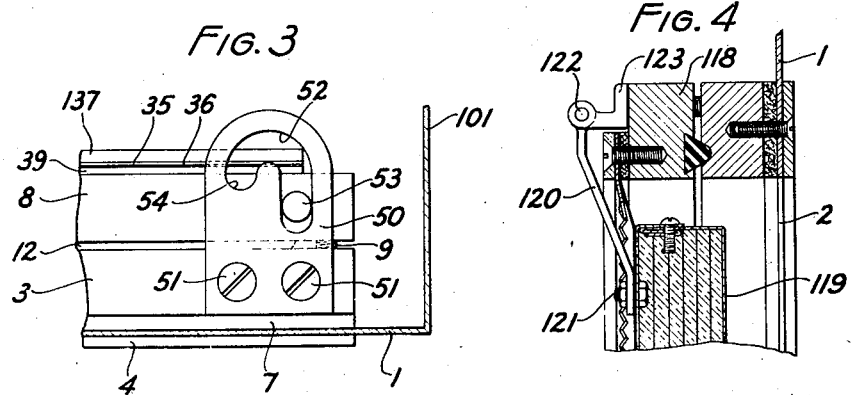
DONALD W. BUSHNELL
        INVENTOR
BY
        ATTORNEYS Patented Nov. 10, 1942

2,301,365

UNITED STATES PATENT OFFICE 2,301,365

PRESSURE RELIEF VENT

Donald W. Bushnell, Rochester, N. Y., assignor to Eastman Kodak Company, Rochester, N. Y., a corporation of New Jersey Application March 6, 1940, Serial No. 322,585

3 Claims. (Cl. 220—89)

This invention relates to pressure relief vents of a type which may be built into a machine, building or other closure, in which volatile solvents or other readily combustible materials may be handled.

One object of my invention is to provide a relief vent which is insulated so that temperatures inside of the closure may be readily controlled. Another object of my invention is to provide a relief vent designed so that an extremely slight increase in pressure may cause the relief vent to open and to relieve the pressure inside of the enclosure. Another object of my invention is to provide a relief vent constructed of fireproof materials which are light in weight and which can readily be kept perfectly clean. Another object of my invention is to provide a relief vent in the form of a window, there being a closure for the window made of light-weight material which is movably mounted with respect to the window so that readily rupturable material attached to the closure and the window may readily be broken to relieve pressure. Other objects will appear from the following specification, the novel features being particularly pointed out in the claims at the end thereof.

Coming now to the drawing wherein like reference characters denote like parts throughout:

Fig. 1 is a top plan view, partially broken away, showing a pressure relief vent constructed in accordance with and embodying a preferred form of my invention.

Fig. 2 is an enlarged sectional view taken on line 2—2 of Fig. 1, but showing the part broken away in Fig. 1.

Fig. 3 is an enlarged fragmentary detail of a preferred type of hinge which may be used in connection with the relief vent shown in the preceding figures.

Fig. 4 is a fragmentary detail elevation showing a modified form of cover support.

In Patent No. 1,930,138, Van Derhoef, for "Explosion vent," granted October 10, 1933, there is shown an explosion vent over which the present application is an improvement. In the Van Derhoef patent, the explosion vent consisted of a flexible sheeting which is preferably made of transparent material and which may be of cellulosic material, impregnated fabric, rubber or other suitable sheeting. When this sheeting is distorted by pressure within an enclosure, it is brought in contact with a series of sharp teeth designed to facilitate rupturing of the material to relieve the pressure on the enclosure.

In my present invention, I have provided a relief vent which is also designed to relieve pressure and which differs from the Van Derhoef construction primarily in providing an insulated covering for the opening to control temperatures inside the enclosure and to provide a light-weight all-metal vent which will work satisfactorily at comparatively small differences between the pressures inside and outside of an enclosure.

Referring to the drawing, the enclosure which may consist of a building, machine, or other enclosure, may include walls 1 and in such walls I provide one or more pressure relief vents, each of which may consist of a window 2, formed in a wall of the enclosure, this window preferably including a frame 3 which may extend around the window 2 and which may be attached thereto by means of a frame 4 through which screws 5 may pass into the tapped openings 6 in the frame member 3.

I prefer to provide a gasket 7 which may be of a well known type including a woven cloth tape in which wires are inserted, the tape being bound by a heat setting cement. Such a gasket is preferably used to make a gas-proof joint between the frame 3 and the wall 1.

I prefer to provide the window frame in two sections—the section 3 above described and a second section 8, this section being preferably attached to section 3 by means of screws 9 entering the tapped holes 10 in the frame 3. It is convenient in setting up a window frame to use short dowel pins 11 for properly registering the frames 3 and 8, and these may or may not be used, as desired.

In order to form a gas-tight joint between the frames 3 and 8, I provide a molded rubber gasket 12 which extends completely around one of the frame members here shown as frame member 8, having a dovetail connection with and being held in position by the dovetail slot 13. This gasket has a rounded outer edge 14 which engages a complementary shaped groove 15, so that when the frames 8 and 3 are screwed together, they form a gas-tight connection.

The frame 8 is preferably provided with a series of downwardly extending brackets 16, each of which has an inwardly extending flange 17, this flange being adapted to position and support a rigid cover member 18. This cover member may be in the form of a box-like housing consisting of a bottom wall 19 with upstanding side walls 20, these side walls preferably being formed over at 21 to form a sufficiently thick wall to receive screw threads so that screws 22 may fasten the downwardly extending flanges 23 of a cover member 24 securely in place.

The screws 22 are preferably provided with means for preventing their complete removal, such as drops of solder 25, so that when the screws are backed out, the cover member 24 may be removed, since the screws merely pass through slots in the flanges 23.

The shallow, box-like receptacle is preferably made of light-weight metal, such as thin aluminum sheeting, and it is preferably filled with an insulating material 26.

It is frequently desirable to control the temperature in an enclosure which may contain volatile solvents, and it is always desirable to prevent dust or dirt from entering into such an enclosure. Therefore, I provide the insulation 26 by utilizing a plurality of layers of crumpled bright metal foil, such as aluminum foil, because this material forms a satisfactory insulating material and is not liable to produce dust. Moreover, the aluminum foil is totally enclosed in the rigid member by the aluminum sheeting forming the box-like enclosure.

The rigid member may be provided with a means for restraining the movement of this member if it is suddenly moved through a change in pressure. Such means may consist of chains 27, attached to plates 28 by means of bolts 29 passing through the rigid member. These bolts may pass through a sleeve 30 and a cotter pin 31 passing through the bolt and sleeve may allow the nut 32 and the plate 28 to be removed, so that the cover member 24 may be removed without removing the bolts from the shallow, box-like structure.

The outer walls of the rigid cover member 19 are of substantially the same shape as the window frames 3 and 8, but the size is such that a space remains between the edges of the rigid member and the window frame. This space is completely covered by a sheet 35 of thin aluminum foil which may be conveniently made .001" thick and which is preferably of dead soft material. Such foil is, of course, quite flexible, so that as the gas pressure inside of the enclosure builds up, it may flex outwardly. Such flexing causes the metal foil to engage the sawtooth-like edges 37 on the plate 36 which extend completely around the window frame 8 and assist in rupturing the thin, flexible, readily frangible sheet 35. It is only necessary of the sheet 35 to cover the opening between the rigid member and the window frame. However, since it is not always easy to make a gas-tight joint with sealing strips just covering this opening, I find it most convenient to use a single sheet of material 35 and to cement it to the entire top of the rigid member 19 and to fasten the four edges tightly to the window frame 8 by means of a series of strips 137, one extending along each of the four sides of the windows. These strips 137 may be attached by screws 38 to the window frame 8, and I preferably include beneath the strips 137 a gasket 39 which may be rectangular and made in one piece, or which may be made of four strips tightly fitted at the corners. This gasket may be of the same material as the gasket 7.

In use, as many of these pressure relief vents may be provided as are necessary for the size of the enclosure. When pressure suddenly builds up in the enclosure, the entire rigid cover member 19 moves upwardly, away from its supporting brackets 16, immediately drawing the four edges of the flexible sheeting 35 against the saw teeth 37, severing the metal foil and relieving the pressure. Normally, the chains 27 will be sufficient to prevent the rigid member 19 from moving far from the pressure relief vent and thus possibly damaging other parts of the enclosure or injuring workmen. However, if there is only a very slight increase of pressure, it is possible for the metal foil 35 to flex sufficiently to rip out at one or more places to relieve pressure. In such case, the rigid closure member 19 may move only slightly upon its bracket 16, or may not even move at all. If it moves only slightly, the beveled guiding edges 40 of the bracket 16 will permit the rigid member 19 to again seat itself on the flanges 17 unless, of course, the rigid member 19 is moved completely away from the window frame 8. In any event, the beveled edges 40 facilitate placing the rigid member 19 in returning it to its original position after a pressure change has occurred.

It is frequently necessary to utilize the windows 2 for manholes, so that workmen can enter the machine or enclosure for repairing, cleaning or other purposes. It is for this reason that the window frames are made in two sections 3 and 8, so that the frame 8, with the bracket 16, and the rigid member 19 may all be moved relative to the frame 3 to permit workmen to enter the window 2. For such purposes, I have sometimes found it convenient to provide a pair of hinge plates 50 of the special shape shown in Fig. 3. In this case, the window frames 3 and 8 lie adjacent to an upstanding wall 101 of the enclosure, which is an extension of the wall 1, and the frame 3 is equipped with the plate 50 which may be attached by screws 51. This plate is provided with a slot 52 in the shape of an inverted J, to receive a pin 53 of the frame 8 serving as a hinge pintle. In order to open this window, the screws 9 are taken out of the frame 8, so that this frame may be moved vertically with respect to the frame 3, raising the pin 53 up in the slot. As soon as the frame has been removed from the dowel pins 11, the pin may be swung around the curved portion of the slot 52 to rest in the end notch 54 and the entire cover member 19, with its associated parts, can be swung about this portion of the plate as a hinge, so that the cover does not need to be disassembled except as above described.

I have described a preferred form of pressure relief vent in which the vents are arranged on the top or substantial horizontal wall of the machine. I have found this generally the most desirable location for such vents, but it is also possible to make such vents in various different locations, and to provide them on vertical or other walls, in which case the shape of the bracket 16 must be altered to suit the particular position, or the rigid member 19 may be provided with a special type of hinge member, as indicated in Fig. 4, which will support the weight of the rigid member 19 and permit it to swing outwardly upon an increase in pressure. As indicated in Fig. 4, the cover member 119 may be attached to the hinge members 120 by suitable bolts 121, this hinge member being adapted to turn about a pintle 122 of the hinge member 123 attached to the frame member 118. In this case, of course, it is not necessary to provide chains 27 to restrain the movement of the rigid member, because this will be done by the hinge members.

It will be noticed that in any case the rigid closure member 19 is well insulated, and since there is a bright metal foil sheet totally covering the complete window 2, there is comparatively little heat exchange occurring at the places where these explosion vents are provided in the machine, so that it is possible to carefully regulate the temperature of the enclosure where this is necessary.

What I claim is:

1. An explosion vent comprising in combination, an enclosure including a wall, a window in said wall, a frame extending about said window, brackets supported by the frame, and a closure for the window comprising a cover adapted to rest on the brackets and including a plurality of layers of bent, light-weight metal foil contained in a light-weight metal container and a thin sheet of readily rupturable metal extending completely over the cover and attached to the frame, whereby pressure in the enclosure may move the cover, rupturing the thin sheet of rupturable metal to release pressure in said closure.

2. An explosion vent comprising in combination, an enclosure including a wall, a window in said wall, a frame extending about said window, a closure for the window, hinges supporting an edge of the closure from an edge of the frame, and a thin sheet of readily rupturable metal extending completely over the closure for the window and attached to the frame, whereby pressure in the enclosure may move the closure for the window, rupturing the thin sheet of rupturable metal to release pressure in said closure.

3. An explosion vent comprising, in combination, an enclosure including a wall, a window in said wall, a frame extending about said window, a closure for the window, insulation carried by the closure, hinges suspending an edge of the closure from an edge of the frame and a thin sheet of readily rupturable metal extending completely over the closure for the window and attached to the frame, whereby pressure in the enclosure may move the closure for the window rupturing the thin sheet of rupturable metal to release pressure in said closure.

DONALD W. BUSHNELL.